United States Patent [19]

Bustle

[11] Patent Number: 4,549,368
[45] Date of Patent: Oct. 29, 1985

[54] ANIMAL TRAP

[76] Inventor: Robert G. Bustle, R.R. #1, Versailles, Ind. 47042

[21] Appl. No.: 637,429

[22] Filed: Aug. 3, 1984

[51] Int. Cl.⁴ .............................................. A01M 23/24
[52] U.S. Cl. ............................................ 43/88; 43/94
[58] Field of Search ............... 43/88, 89, 90, 91, 92, 43/93, 94, 95, 96, 58

[56] References Cited

U.S. PATENT DOCUMENTS

| | | | |
|---|---|---|---|
| 982,911 | 1/1911 | Werrick et al. | 43/88 |
| 1,174,535 | 3/1916 | Ahern | 43/94 |
| 1,553,536 | 9/1925 | Irvine | 43/92 |
| 1,762,783 | 6/1930 | Kascak | 43/94 |

*Primary Examiner*—Nicholas P. Godici
*Assistant Examiner*—M. Jordan
*Attorney, Agent, or Firm*—Wood, Herron & Evans

[57] ABSTRACT

An animal trap having a housing with an access opening surrounding a trap mechanism. The trap mechanism includes a pair of arms pivotally mounted on a base of the housing, each arm having a free end forming a jaw. The arms are positioned relative to one another so that they are pivotable between a jaws open position in which the arms are pivoted away from one another and the jaws spaced apart and a jaws closed position in which the arms are pivoted toward one another and the jaws urged into engagement. A drive frame which engages the arms of the trap mechanism is slidably mounted on a pair of vertical posts within the housing. A pair of springs on the post urge the drive frame upwardly from a lower position in which the arms are free to pivot into the jaws open position to an upper position in which the arms are urged by the drive frame into the jaws closed position. A trip mechanism made up of a pair of elongated links is coupled between the arms for releasably locking the arms in the jaws open position when the trap is set. In response to an applied force the trip mechanism releases to permit the movement of the arms into the jaws closed position under the influence of the spring biased drive frame.

4 Claims, 5 Drawing Figures

FIG. I

ANIMAL TRAP

FIELD OF THE INVENTION

This invention relates to animal traps of the type used to capture an extremity of an animal. In the particular form disclosed, the invention relates to an animal trap for capturing the leg or paw of a small, dexterous animal, such as a raccoon.

BACKGROUND OF THE INVENTION

One of the most popular animal traps in use today is what is referred to as the two-jaw flat set trap. This trap basically comprises two opposed jaws which are spring-loaded to snap together when the trap is tripped to catch the leg of an animal therebetween. It is called the flat trap from the fact that the jaws in the cocked position are pulled apart and are releasably locked about 180° apart, such that the jaws are roughly coplanar. This provides a low profile for the trap, and enables it to be more easily hidden under brush, or more typically, buried in soil.

Although this type of trap has achieved widespread use, it has always had several disadvantages. One significant disadvantage is that the trap is entirely "open" in use. That is, any animal coming upon the trap, such as a hunting dog, can step onto and trip the trap and get caught therein. The inadvertent trapping of dogs has, in fact, been a significant problem with the flat trap.

The bait used with this type of trap is also completely exposed. It is thus subject to degradation from sun and rain. More importantly, the bait can be stolen from the trap, as by birds or rodents which are too small to be captured therein.

The flat set trap must also be placed on the ground, or buried under the soil. This has two immediate disadvantages. First, where the trap is buried in the soil, it is subject to being "frozen in". That is, should the covering soil freeze, the trap can thereby also be locked open by the frozen soil, rendering it inoperative. Secondly, the trap lacks versatility in that it only can be used on the ground, and only in an upright position. Tree climbing animals, such as raccoons, must therefore be captured on the ground, where the trap is, of course, subject to being sprung by other animals which a trapper may not desire to capture.

The principal object of this invention is to provide a more versatile trap which can be set for use in a variety of positions and locations, and which does not have an exposed trap mechanism which can be tripped by unwanted prey, such as dogs, but rather has a restricted access to the trip mechanism to thereby prevent such unwanted captures.

Another objective of the invention is to provide such an enclosed animal trap with a setting mechanism which can be operated exterior to the trap to set the trip mechanism.

These objectives, and others, have been accomplished in this invention through the provision of an animal trap which has a novel trip mechanism which is enclosed by a housing having an opening therein through which the animal must reach to get the bait. Access to the trip mechanism can thus be limited by proper sizing of the opening to only those animals which are small enough to reach through the hole. If the hole is sized for a paw, for example, a reaching motion is required to access the bait, and the trap is readily adapted for the capture of dexterous animals, such as raccoons, to the exclusion of inadvertent capture of dogs which generally lack the ability to insert a paw through the opening. Sizing of the opening thus limits the type of prey which can be captured by the trap. Because the trap is enclosed, the bait is also protected from environmental degradation as well as theft of the bait by birds and larger rodents.

Significantly, the trap of this invention can be set in a desired position or location. That is, the trap can be placed in any orientation on the ground, such as on its side, or can be placed in a tree and still function. Because the trap is enclosed, it does not have to be hidden by burying, thus obviating "freeze in" of the trip mechanism.

The trip mechanism of this invention has a pair of arms which are each pivotally mounted on a base of the housing, each arm having a free end forming a jaw. The jaws are opposed, with the arms being arranged relative to one another so that they are pivotable between a jaws closed position, in which the arms are pivoted toward one another and the jaws are urged toward engagement, and a jaws open position in which the arms are pivoted away from one another with the jaws spaced apart.

The arms are driven together to forcibly close the jaws by a spring-loaded drive frame which is mounted to slide along a pair of spaced apart vertical posts which extend through the housing base. In a present form, the drive frame has a pair of opposed struts which extend between a pair of mounts, or blocks, which slide along the vertical posts. The opposed struts form a rigid band around the jaw arms.

Extending between the struts adjacent the blocks are a pair of drive rods which contact the arms carrying the trap jaws. When the trap is tripped, the spring-loaded drive frame is driven along the vertical posts to an end position. The rods on the drive frame in turn advance along a surface of each arm, which, in the jaws open position, are angled outwardly relative to the plane of movement of the drive members. As the rods move upward, they drive the angled arms together, closing the trap jaws.

The trip mechanism of the trap includes a collapsible hinged linkage which is pivotally connected at each end to the jaw arms and extends between the arms. The linkage operates on an over-center principle such that it will lock the arms in the jaws open position when arranged on-center or over-center, and will release the arms when placed in an under-center position, as by movement of the linkage hinge point by an animal paw.

In a present form, the trip mechanism linkage has two links each of which is connected to a pivot on a respective arm. The two links are further pivotally connected together at a central hinge point with one link having a free end portion. This free end portion bears against a surface provided on the other link when the links are in an over-center position, thereby locking the linkage in place to keep the arms apart. This over-center position is maintained by the load placed on the links from the drive frame which, in the cocked position, applies a force on the arms which urges the arms together, thereby putting a compression force on the linkage.

A bait pan is provided on one of the links. When an animal reaches through the housing opening and contacts the bait in the pan, the pan is rocked or pushed downwardly, causing the links to move an under-center position, where the linkage collapses. This frees the arms to forcibly move toward each other under the action of the driven frame, snapping the jaws together.

The sensitivity of the hinged trip mechanism is advantageously made adjustable through the use of a screw extending through the free end of one link. In this form of the invention, the over-center position can be adjusted by moving the screw toward or away from the other link.

Cocking of the trap mechanism is accomplished exterior to the trap housing. The vertical posts on which the drive frame slides extend through the base of the housing, as previously noted. The ends of the posts exterior to the base are connected by a handle. To cock the trip mechanism, the trap is first turned upside down and the handle is grasped and drawn away from the base. This draws the vertical posts from the housing, which in turn pulls the drive frame against the spring-load and toward the base. Since the drive frame drive rods no longer force the arms together, the arms are thereby free to move apart under the force of gravity and the weight of the hinged linkage and bait pan. The links thereby drop into their over-center position under their own weight, where they are maintained locked upon release of the handle, which places the arms under load via the drive frame. A simple and reliable cocking mechanism is thus provided.

The foregoing objectives and advantages of this invention will be made more readily apparent upon reference to the following detailed description of the invention taken in conjunction with the drawings, in which:

DETAILED DESCRIPTION OF THE INVENTION

Figure 1:
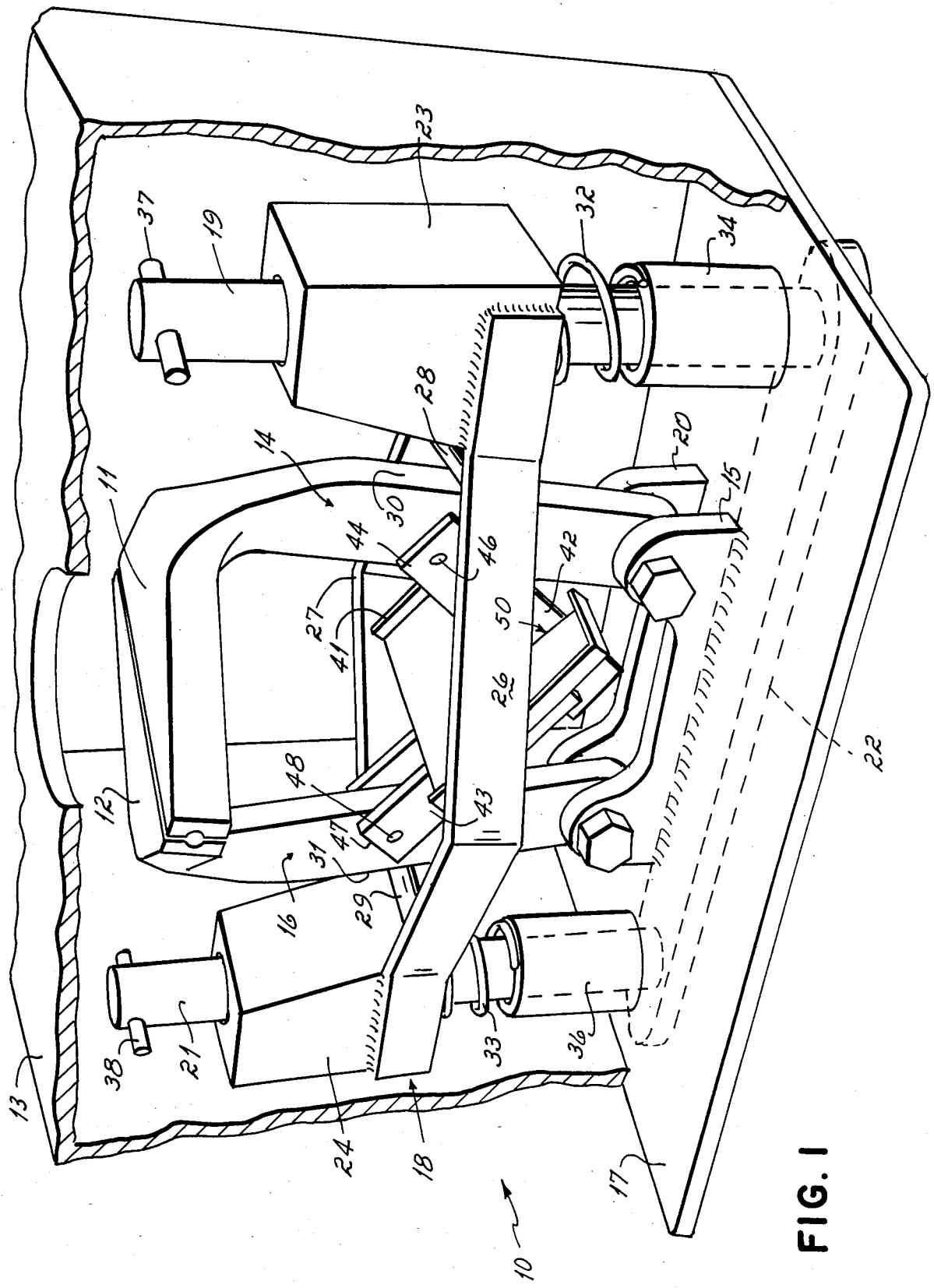
FIG. 1 is a perspective view of a trap made in accordance with this invention with the housing broken away for showing detail of the trap mechanism.

With reference to the figures, a trap 10 includes a pair of base 17 carry two bolts upon which the arms 14, 16 are mounted so that the jaws 11, 12 mounted within a housing 13, movable toward one another to serve to grasp an extremity of an animal when the trap is sprung. In the illustrated form, the jaws 11, 12 are integrally formed at the upper ends of a pair of arms 14, 16, respectively. The arms 14, 16 are pivotally mounted on a base 17. A pair of flanges 15, 20 integrally formed on the jaws 11, 12 may be positioned in a trap-disarmed configuration as shown in FIG. 1, a trap-cocked configuration as shown in FIG. 2, and a tripped configuration as shown in FIG. 3.

In order to drive the jaws 11, 12 together when the trap is tripped, a drive frame 18 configured to engage the arms 14, 16 is slidably received on a pair of posts 19, 21. The post 19, 21 are fixed to a handle 22 beneath the base 17 of the trap 10 to facilitate setting the trap, as shall be discussed in more detail hereinafter. The drive frame 18 includes a pair of drive blocks 23, 24 containing suitable bores to receive the posts 19, 21, respectively. A pair of drive assembly struts 26, 27 are secured between the blocks 23, 24, cooperating therewith to surround the arms 14, 16. A pair of drive rods 28, 29 are secured between the struts 26, 27 interiorly of the blocks 23, 24 adjacent the arms 14, 16. The drive rod 28 is positioned to engage the outer surface 30 of the arm 14, and the drive rod 29 is positioned to engage the outer surface 31 of the arm 16.

The drive assembly 18 is urged upwardly by a compression spring 32 on the post 19 and a compression spring 33 on the post 21. One end of the spring 32 bears against the underside of the block 23, and one end of the spring 33 bears against the underside of the block 24. The other ends of the springs 32, 33 bear against the tops of annular sleeves 34, 36, respectively, which are secured to the base 17. Upward movement of the drive blocks 23, 24 is limited by pins 37, 38 secured in the posts 19, 21, respectively.

Figure 2:
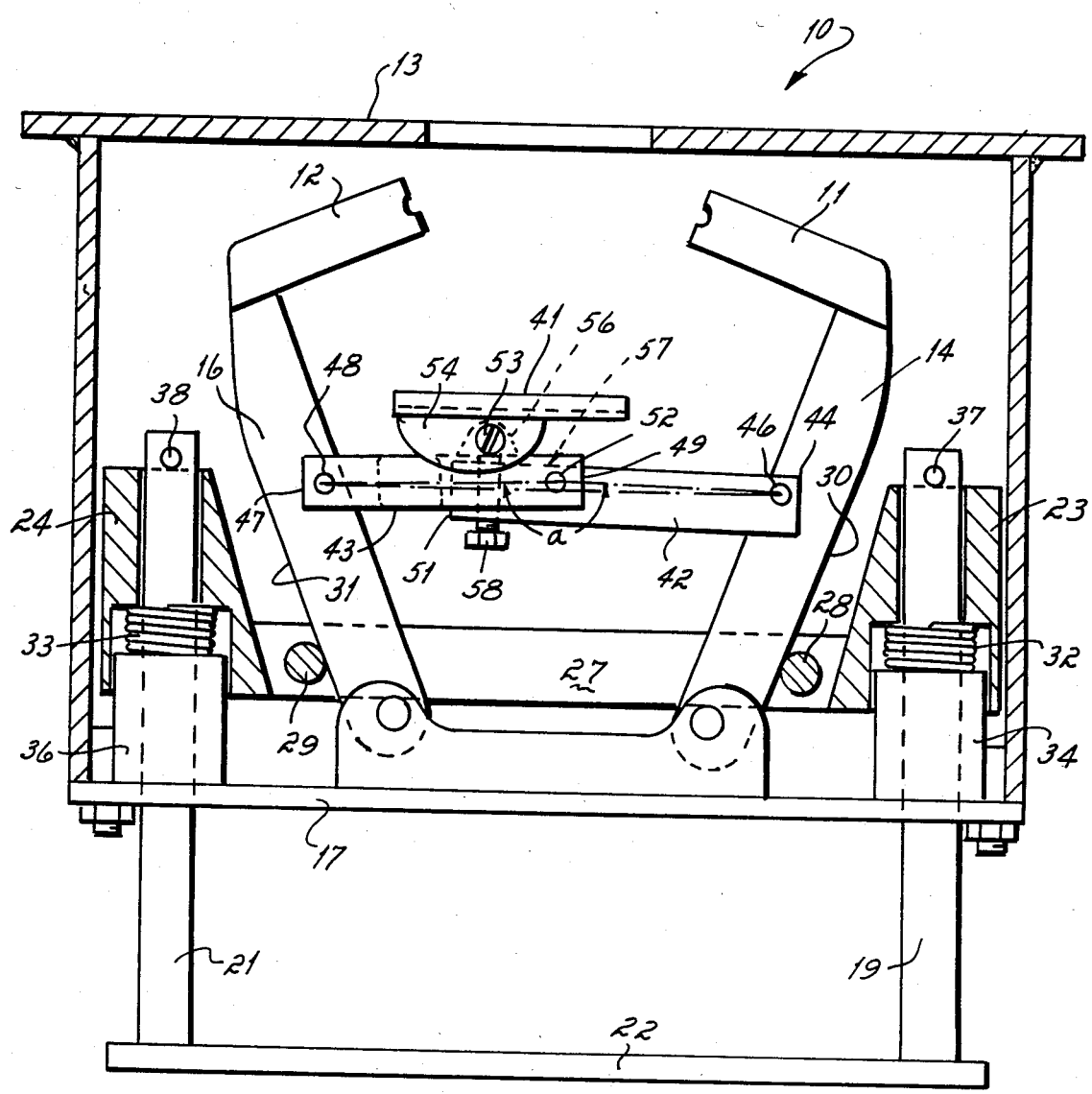
FIG. 2 is an elevational view partly in cross-section of the trap mechanism of FIG. 1 in a cocked configuration with the trip mechanism locked.
Figure 4:
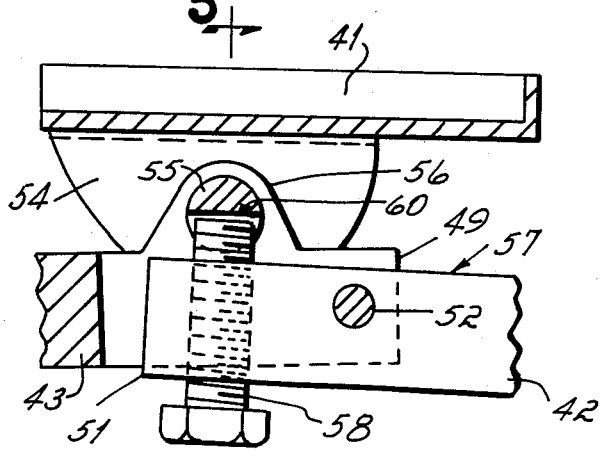
FIG. 4 is an enlarged view of the trip mechanism of the trap as shown in FIG. 2 with portions removed.
Figure 3:
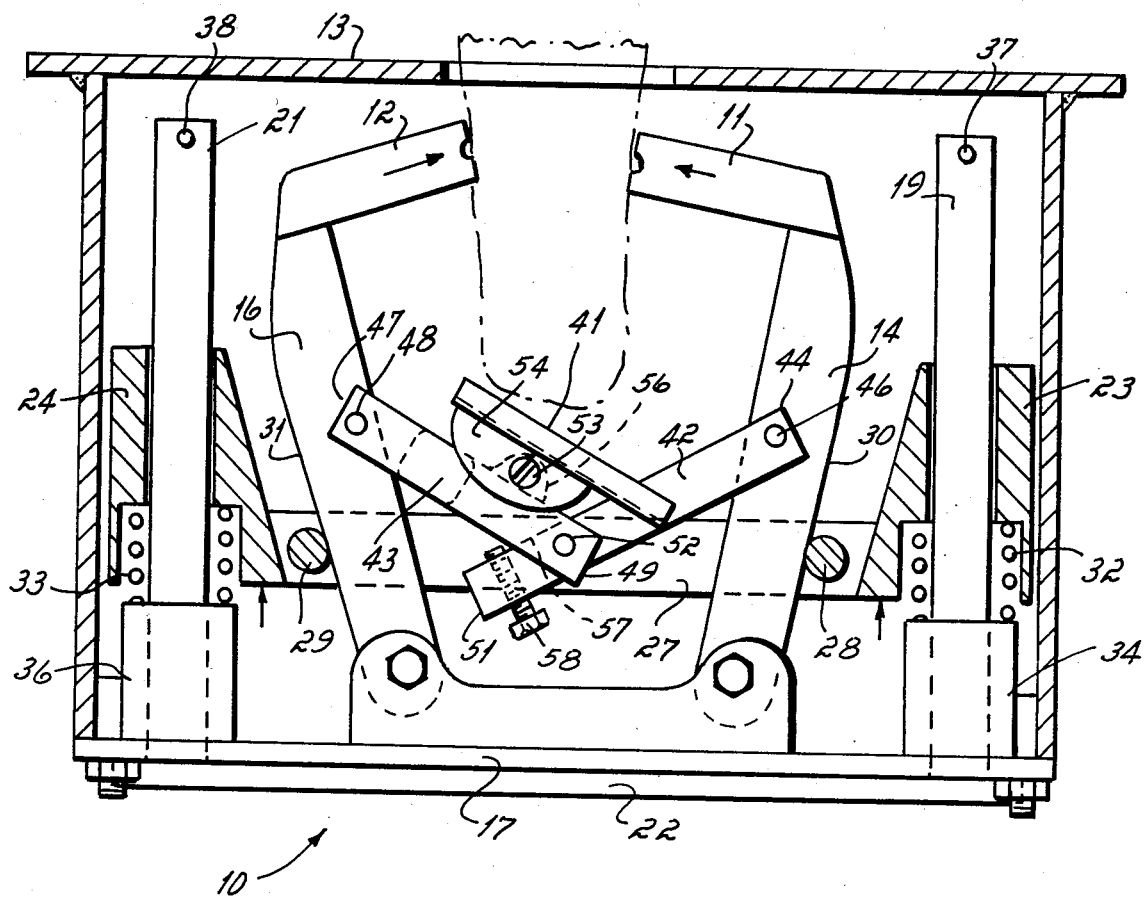
FIG. 3 is a view similar to FIG. 2, but with the trap tripped.

In order to set the trap, placing it in the cocked configuration of FIG. 2, the trap is inverted from its orientation shown in FIG. 1, and the handle 22 is grasped and pulled upwardly away from the base 17. This draws the posts 19, 21 partially out of the housing 13, compressing the springs 32, 33 between the blocks 23, 24 and the bushings 34, 36. With the drive rods 28, 29 no longer holding the arms 14, 16 together, the arms and jaws move apart under the force of gravity due to the weight of a trip mechanism spanning the gap between the arms which includes a bait pan 41 and trip mechanism links 42, 43. As shall be described, the links 42, 43 assume an "over-center" condition to form a strut holding the arms and jaws apart.

When the handle 22 is released, the drive rods 28, 29 are urged into engagement with the arm surfaces 30, 31 under the influence of the springs 32, 33, urging the arms together. However, the strut linkage 42, 43 holds the arms and the jaws apart, and the springs remain compressed between the drive blocks 23, 24 and the bushings 34, 36. The trap 10 may then be inverted to the "right side up" configuration shown in the figures. The posts 19, 21 are then free to move to be returned to the interior of the housing 13, with the handle 22 adjacent the base 17 (as shown in FIG. 3, for example). This may be accomplished, for example, by placing the trap upon the ground.

Considering the trip mechanism in more detail, the link 42 is bifurcated at an end 44 and pivotally attached to the arm 14 by a pin 46. The link 43 is similarly bifurcated at an end 47 and pivotally attached to the arm 16 by a pin 48. The other end 49 of the link 43 is also bifurcated and receives the end 51 of the link 42. A pin 52 pivotally attaches the end 51 of the link 42 to the bifurcated end 49 of the link 43.

The bait pan 41 is mounted for limited rotation on the link 43. To do this, the bait pan is secured to a pin 55 rotatably mounted in the forked end 49 of the link 43. The bait pan 41 includes a pair of flanges 54, extending downwardly on opposite sides of the link 43, which are secured in a fixed position to the pin 55 by screws 53. The flanges 54 and the ends of the pin 55 are suitably apertured to receive the screws 53 so that the bait pan 41 is fixed to the pin 55, and tilting of the bait pan upwardly and downwardly consequently results in rotation of the pin.

The forked end 49 of the link 43 includes a pair of upwardly extending ears 56 to serve as bearings to carry the pin 55, which is rotatable therein. The bait pan 41 includes a slot 50 to receive the link 42 when the trap is not set and the bait pan and the pin 55 are rotated to the position shown in FIG. 1.

In order to achieve the "over-center" condition to set the trap, the links 42, 43 are sized, and the pivot points located, so that the linkage hinge pin 52 is below a line joining the pins 46 and 48 (above said line for the right side up orientation of the trap illustrated in FIG. 2). Stated otherwise, the angle a (FIG. 2) formed between a line joining the pins 46, 52 and a line joining the pins 48, 52 is less than 180°. In this way, even after the trap is turned "right side up" (to the orientation shown in FIG. 2), the spring force applied via the pins 28, 29 to the arms 14, 16, urging the arms together, serves to maintain the links 42, 43 in the "over-center" condition shown in FIG. 2.

Figure 5:
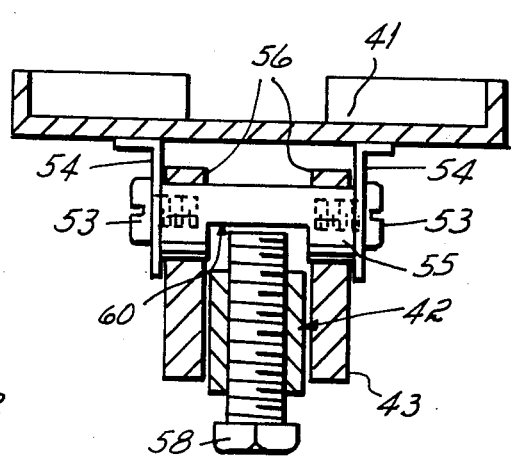
FIG. 5 is a sectional view of the mechanism of FIG. 4 taken along the line 5—5 of FIG. 4.

In the illustrated form, the trap 10 includes means for adjusting the sensitivity of the links 42, 43 to forces tending to move the linkage from the "over-center" condition after the trap is set. In order to do this, a screw 58 is threadedly received in a vertical bore through the end 51 of the link 42. The end of the screw is positionable to contact a flat 60 on the underside of the pin 55. As best seen in FIG. 5, the extent to which the screw 58 is threaded through the link 42 determines the spacing between the end of the screw and the flat 60. Rocking the bait pan 44 upwardly or downwardly results in rotation of the pin 55 and the engagement of a portion of the flat 60 with the end of the screw 58. The degree of movement of the bait pan in order to effect this contact between the flat 60 and the end of the screw 58 is determined by the extent to which the screw 58 is threaded through the link 42.

After the trap is set, as shown in FIG. 2, an attempt by an animal to remove bait from the bait pan 41 will either result in rocking the bait pan or the production of a downward force on the bait pan. A downward force on the bait pan pushes the bait pan, and hence the linkage hinge pin 52, downward, moving the links 42, 43 to an "under-center" condition.

If the bait pan 41 is rocked in either direction, even without the exertion of a direct downward force on the bait pan, the rocking of the bait pan results in the rotation of the pin 55 and engagement of the flat 60 on the pin 55 with the end of the screw 58. This engagement of the flat 60 with the end of the screw 58 in turn urges the link 42 downward, moving the linkage to an "under-center" condition.

Once the links 42, 43 have been moved "under-center", the force on the arms 14, 16 exerted by the drive rods 28, 29 urges the arms and the jaws 11, 12 together. The linkage then collapses to the position shown in FIG. 3.

As the arms move together, the drive rods 28, 29 are moved upwardly under the influence of the spring force, camming against the surfaces 30, 31 of the arms. The drive rods 28, 29 move upwardly, pivoting the arms 14, 16 together, and urging the jaws 11, 12 into engagement with one another until the extremity of the animal is secured between the jaws. Thereafter, the spring force acting through the rods 28, 29 and the arms 14, 16 holds the animal between the jaws.

In using the trap 10, once the trap has been set, the trip mechanism made up of the links 42, 43 is held in the "over-center" condition regardless of the orientation of the trap. Consequently, the trap need not be placed on the ground, but could be placed in a tree or the like either resting upon the base 17 or at an angle. To secure the bait on the bait pan 41, the bait may be placed upon or suitably secured to the bait pan prior to setting the trap. A clip or the like may be formed on the bait pan for holding the bait and clipping it to the bait pan in order to prevent removal of the bait by small animals or birds without triggering the trip mechanism of the trap.

While the invention has been described in connection with a trap for small dexterous animals such as raccoons, it will be understood that it is also applicable to traps of other sizes, such as those for trapping larger animals. The trap may also be employed utilizing a trip mechanism without the adjustment screw 58. In such a case, the upper surface 57 of the link 42 is positioned adjacent the flat 60 of the pin 55 so that rotation of the pin results in engagement of a portion of the flat with the surface 57.

What is claimed is:

1. An animal trap comprising:
a housing including a base and having an access opening;
a pair of arms each pivotally mounted on the base of the housing and each having a free end forming a jaw, the arms being positioned relative to one another so that the arms are pivotable between (a) a jaws open position in which the arms are pivoted away from one another and the jaws spaced apart and (b) a jaws closed position in which the arms are pivoted toward one another and the jaws urged into engagement;
a pair of vertical posts extending into the housing through the base;
a drive frame slidably mounted on the vertical posts including a pair of surfaces, each normally contacting a different one of the arms;
means for urging the drive frame upwardly along the vertical posts from (a) a lower position in which the arms are free to pivot into the jaws open position to (b) an upper position in which the arms are urged into the jaws closed position by the arm-contacting surfaces of the drive frame;
means for moving the drive frame into its lower position in order to permit setting the trap, the means for moving the drive frame into its lower position comprising a handle outside the housing attached to the pair of vertical posts, each post including means in the housing for engaging the drive frame, whereby the handle may be drawn away from the housing, withdrawing the post from the housing, moving the drive frame toward the base out of engagement with the arms so that the arms are free to pivot to the jaws open position; and
trip means coupled between the arms for releasably locking the arms in the jaws open position when the arms are pivoted into the jaws open position with the drive frame in its lowered position, thereby setting the trap, and for releasing the locking of the arms in the jaws open position in response to movement of the trip means to permit urging of the arms into the jaws closed position, thereby springing the trap.

2. An animal trap comprising:
a housing having a base and an opening therein;
a pair of opposed jaws adjacent the opening, each supported on an arm, each arm pivotally connected to said base to permit movement of said jaws together and apart;
trip means for springing the trap including first and second hinged strut links intermediate the jaws pivotally connected to the arms and to one another for releasably locking the jaws in an open position with the links connected to one another in an over-center position;

jaw driver means for driving the jaws together including a pair of opposed posts, a drive frame slidably carried on said posts and extending therebetween having a pair of drive rods slidably contacting said arms to propel said jaws together when said trip means is actuated, and at least one spring for urging said drive frame along said posts;

cocking means for setting said trip means including means for pulling said drive frame against the bias of said at least one spring to a position where said pair of strut links is in an over-center position, wherein said posts extend through said base and are fixed to a handle extending therebetween outside the housing, and further including stops on said posts limiting the travel of said drive frame thereon, said posts, handle and stops comprising said cocking means.

3. A trap for dexterous animals comprising:

a housing having a base, a pair of opposed jaws for gripping the leg of an animal therebetween when said jaws are closed, a pair of elongated arms supporting said jaws and connected at a pivot point to said base, each arm having a generally straight outwardly-facing portion which is at an acute angle to the horizontal when said jaws are open, a collapsible hinged strut pivotally connected to said arms and extending therebetween, said hinged strut having first and second strut elements which in a first position bear against one another in an over-center arrangement to releasably lock said arms against jaw-closing movement, and in a second position are unlocked and in an under-center arrangement permitting free jaw-closing movement of said arms, a pair of spaced posts extending upwardly from said base, an elongated push-bar captured on and extending between said posts and slidable along said post, said push-bar including a pair of drive members, each drive member engaging said outwardly-facing portion of a respective arm, a pair of springs biasing said push-bar away from said base, a handle exterior to said base and connecting said posts, said handle, when pulled away from said base, withdrawing said posts from said base and pulling said push-bar against said spring bias, thereby permitting said hinged strut to lock in said over-center position which is maintained upon release of said handle by compression applied to said strut by said drive members bearing against said arms, which same compression retains said push-bar in spring-loaded condition, the trap being tripped by an animal moving said strut to an under-center position unlocking said arms and releasing said push-bar to move along said posts, said drive members progressing along said outwardly-facing portions of said arms driving said arms to a less acute angle and thereby driving said jaws together.

4. An animal trap comprising:

a housing having a base and an access opening;

a pair of arms pivotally mounted on the base, each having a free end forming a jaw, the arms being positioned relative to one another so that the arms are pivotable between (a) a jaws open position in which the arms are pivoted away from one another and the jaws spaced apart and (b) a jaws closed position in which the arms are pivoted toward one another and the jaws urged into engagement;

means for urging the arms to pivot toward one another to the jaws closed position;

means for releasably holding the arms pivoted away from one another in the jaws open position, responsive to an applied force to release the arms, permitting the arms to move to the jaws closed position under the influence of the means for urging the arms toward one another, the means for releasably holding the arms pivoted away from one another comprising a pair of elongated strut links extending between the arms, pivotally attached to one another at a first end of each of the links, each link being pivotally attached at a second end to a different one of the arms, the links being pivoted to a first position when the arms are in the jaws open position with the links cooperating to provide a mechanical stop preventing further pivoting of the links to resist a force applied between the arms by the means for urging the arms to pivot toward one another, and the links being free to pivot to a second, collapsed, position relative to one another in response to a force applied to the links, permitting the arms to move to the jaws closed position; and a bait pan rotatably supported on one of the links intermediate the arms having a surface adjacent a portion of the other link and cooperating therewith so that rotation of the bait pan by an animal produces a force coupled from said surface to the other link, causing the links to collapse and permitting the arms to move to the jaws closed position.

* * * * *

UNITED STATES PATENT AND TRADEMARK OFFICE
CERTIFICATE OF CORRECTION

PATENT NO. : 4,549,368
DATED : October 29, 1985
INVENTOR(S) : Robert G. Bustle

It is certified that error appears in the above-identified patent and that said Letters Patent is hereby corrected as shown below:

In column 2, line 67, after "move", insert --to--.

In column 3, lines 49 and 50, delete "of base 17 carry two bolts upon which the arms 14, 16 are mounted so that the".

In column 3, line 57, before "jaws", insert --base 17 carry two bolts upon which the arms 14, 16 are mounted so that the--.

Signed and Sealed this

Eighteenth Day of March 1986

[SEAL]

Attest:

DONALD J. QUIGG

Attesting Officer

Commissioner of Patents and Trademarks